March 17, 1931.  W. F. HELLER  1,796,928
DISTRIBUTING APPARATUS FOR FONDANT, CREAM, AND OTHER CONFECTIONS
Filed March 17, 1930
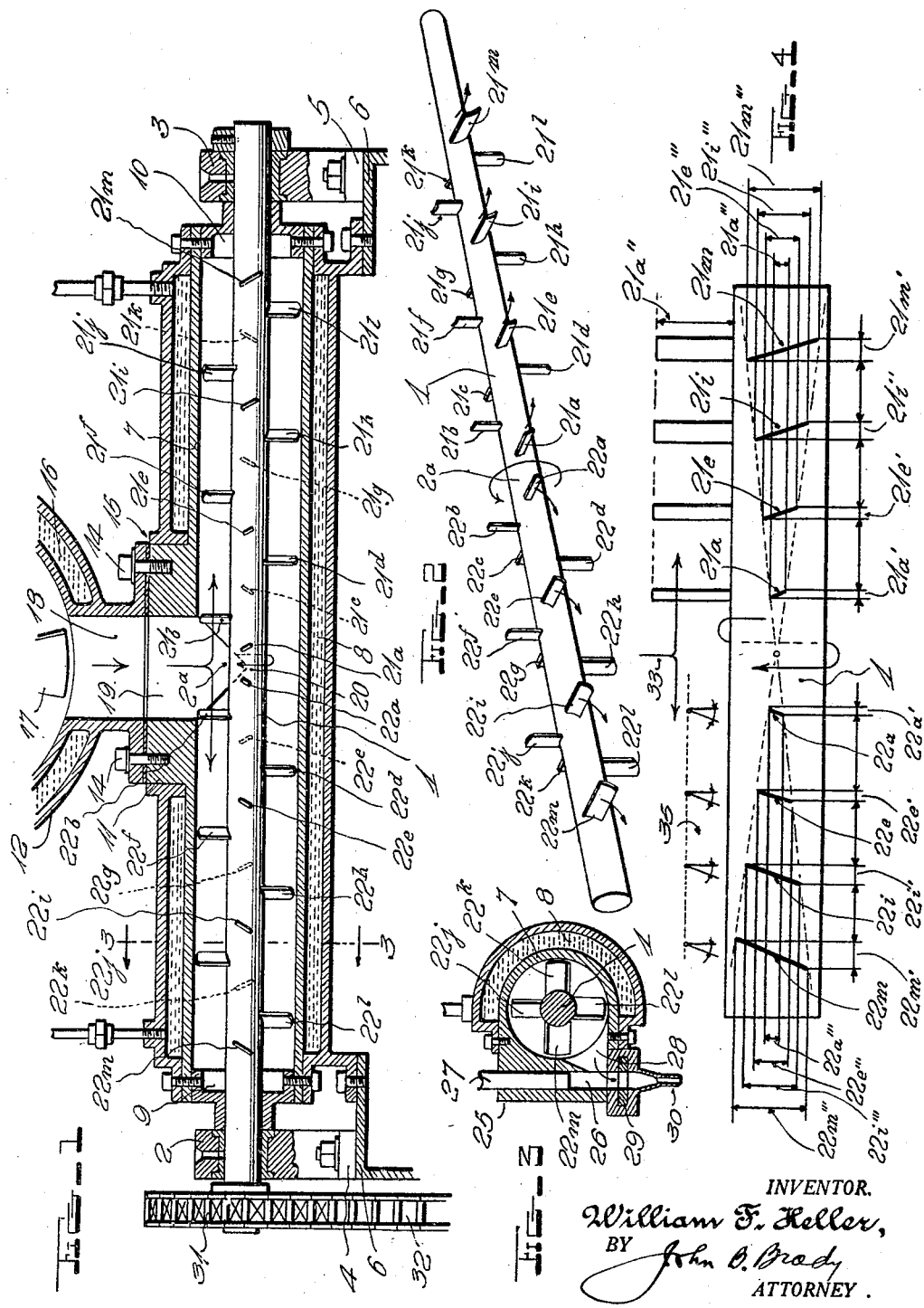
INVENTOR.
William F. Heller,
BY John C. Brady
ATTORNEY.

Patented Mar. 17, 1931

1,796,928

UNITED STATES PATENT OFFICE

WILLIAM F. HELLER, OF RICHMOND HILL, NEW YORK, ASSIGNOR TO LOFT, INC., OF LONG ISLAND CITY, NEW YORK, A CORPORATION OF DELAWARE

DISTRIBUTING APPARATUS FOR FONDANT, CREAM, AND OTHER CONFECTIONS

Application filed March 17, 1930. Serial No. 436,443.

My invention relates broadly to apparatus used in the manufacture of fondant, creams, and candied centers for confections, and more particularly to means for distributing fondant in the manufacture of confections.

One of the objects of my invention is to provide a construction of distributor for fondant or cream in a machine for manufacturing confectionery in which movement of the fondant through the machine may be maintained at a predetermined rate without excessive agitation of the fondant.

Another object of my invention is to provide a construction of distributor for fondant or cream in a confectionery making machine comprising a rotatable shaft member having radially extending members thereon of differing dimensions and disposed at different angles for imparting a uniform movement to fondant or cream in the course of its passage through the confectionery machine while preventing excessive agitation of the fondant.

A further object of my invention is to provide a construction of distributor for fondant or cream in a confectionery machine wherein a rotatable shaft member carries a multiplicity of angularly disposed members thereon, the said members being divided into two sets at the center of the shaft member with the members of one set extending in an angular direction opposite to the direction of the members of the other set and varying in width from a relatively small size adjacent the center to a relatively wider width adjacent each end of the rotatable shaft.

A still further object of my invention is to provide a construction of rotatable distributor for fondant or cream in which motion is imparted to material delivered at a position substantially central of the rotatable distributor for moving the material in opposite directions along the rotatable distributor without producing excessive agitation of the fondant or other material.

Other and further objects of my invention reside in the construction of distributor as set forth more fully in the specification hereinafter following by reference to the accompanying drawings, in which:

Figure 1 is a side elevation of the distributor journaled in position in a confectionery making machine; Fig. 2 is a perspective view of the rotatable shaft of the distributor of my invention; Fig. 3 is a cross-sectional view through the distributor and associated parts of the confectionery machine on line 3—3 of Fig. 1; and Fig. 4 is a theoretical view illustrating the arrangement of radial members on the rotatable shaft of the distributor and the relative positions thereof for moving the fondant in opposite directions from a central position.

As set forth more fully in the copending application of Peter C. Laureys, Serial No. 436,459, filed March 17, 1930, for method and apparatus for making confections, the importance of controlling the rate of movement of fondant through the confectionery machinery for preventing graining has been fully set forth. It has been found that fondant which is subjected to excessive agitation or beating produces creams which are grained in such manner as to impair the edible qualities thereof. Excessive graining in the confectionery creams is disagreeable and tends to destroy the taste appeal which the cream would otherwise possess.

It is essential, however, to produce movement of the fondant through the confectionery machinery in distributing the fondant to a multiplicity of depositors in discharging the fondant to molds. I have devised a construction of distributor as more fully hereinafter set forth by which a uniform distribution of the fondant to the depositor may be obtained without graining of the creams. I provide a rotatable shaft member having members radially positioned with respect thereto and disposed at different angles one to another in separate sets on opposite sides of the center, the members of one set increasing in width from a relatively narrow width adjacent the center to a relatively wide width adjacent the remote ends of the shaft. The arrangement of the radial members is such as to impart the required movement to the fondant without producing graining in the creams which are deposited.

Referring to the drawings in more detail, I have shown the distributor of my invention as comprising a rotatable shaft 1 which is journaled at opposite ends in bearings 2 and 3 carried by supports 4 and 5 on frame structure 6. The shaft 1 extends through cylindrical distributor chamber 7 which is maintained at a desired constant temperature by means of the fluid circulating jacket designated at 8. The ends of the distributor chamber are closed by any suitable closure members 9 and 10 through which the shaft 1 extends. The central part of the distributor chamber 7 is provided with a cast head 11 to which the beater chamber 12 is coupled by means of suitable screws 14 which extend through the head 11 through the gasket 15. The beater 12 is maintained at suitable uniform temperature by means of the fluid circulating jacket 16. A portion of the movable member of the beater has been indicated at 17. The beater 12 discharges through discharge pipe 18 into the inlet pipe 19 of the distributor chamber in such manner that the fondant discharged from beater 12 is gravitationally conveyed to the distributor chamber 7 at a central position 20 with respect to the rotatable shaft 1. The rotatable shaft 1 carries two sets of radially extending members one set of which I have indicated by reference characters 21a, 21b, 21c, 21d, 21e, 21f, 21g, 21h, 21i, 21j, 21k, 21l and 21m on one side of the center 20, while the other set has been designated 22a, 22b, 22c, 22d, 22e, 22f, 22g, 22h, 22i, 22j, 22k, 22l and 22m.

The distributor cylinder 7, connects to a head 25 which includes a multiplicity of depositor cylinders 26 in which plungers 27 operate. Each cylinder 26 is connected by a passageway 28 with the distributor cylinder 7. A reciprocating slide 29 having apertures which register with each of the depositor cylinders 26 is operated in proper timed relation to the movement of the plungers 27 to cut off the charge of fondant which is discharged through nozzle 30 to the molds beneath. Motion is imparted to shaft 1 by any suitable form of drive such as a sprocket wheel 31 on the end of the shaft 1 which is driven by a continuous chain 32 from any suitable source of motive power. The angular inclination of the radially extending members has been shown more clearly in Fig. 2, where the members 21a and 22a are disposed in opposite angular directions, while the members 22b—22m extend in angular directions corresponding to the angular direction of the member 22a, and members 21b—21m extend in angular directions similar to the angular direction of member 21a.

In the theoretical diagram in Fig. 4 the disposition of the fondant or cream has been indicated more clearly. The central line 33 designates the path of the fondant from the beater chamber 12. The rotation of shaft 1 is counter-clockwise, when viewed from the left-hand end thereof. The radially extending members are disposed 30 degrees with respect to a lateral line through shaft 1 or 60 degrees with respect to each other. The angular inclination of the radially extending blades of members 21a, 21e, 21i and 21m has been indicated at 21a′, 21e′ and 21m′, respectively. The radial length of all of the blades is the same as has been designated by 21a″. The effective width of the blades varies from a relatively narrow width designated at 21a‴ to a wider width at 21e‴ to a still wider width shown at 21i‴, to the widest width at the end of the shaft 1 designated at 21m⁗. The opposite set of blades which are disposed at an angle opposite the inclination of the aforementioned set of blades is similarly designed. That is to say, blade 22a has an angular disposition with respect to the shaft designated at 22a′. Blade 22d has an angular inclination with respect to the shaft designated at 22e′. Blade 22i has an angular inclination at 22i′, while blade 22m has an angular inclination at 22m′.

I have designated the 30-degree disposition of the several blades 22a—22m by the angle indications at 35. The blade 22a has a substantially narrow width as designated by the dimension 22a‴. Blade 22e has a relatively wider width indicated by the dimension 22e‴. Blade 22i has a wider dimension designated at 22i‴, while blade 22m has a still wider dimension designated at 22m‴. It is understood that the intermediate blades are correspondingly graduated in size so that the blades of narrow width are adjacent the center of the distributor and the blades of wider width are adjacent the remote opposite ends of the distributor.

The arrangement of the blades is such that uniform movement may be imparted to the fondant without excessive agitation, and thereby secure relatively soft cream in the final confection. I have successfully utilized the distributor in the manufacture of candy and confections, and have found a marked increase in the quality of the confection and a decrease in the undesired graining effects therein.

While I have described my invention in one of its preferred embodiments, I desire that it be understood that modifications be made and that no limitations upon my invention are intended other than are imposed by the scope of the appended claims.

What I claim as new and desire to secure by Letters Patent of the United States is as follows:

1. A distributor for fondant, cream and the like comprising a casing, a rotatable shaft member journaled in said casing, means for rotating said shaft, means for delivering fondant, cream or the like at a substantially central position in said casing, said shaft member having a plurality of radially extending blades disposed in spaced relation formed thereon, said blades being divided into separate sets, the blades of one set extending in an angular direction opposite to the angular direction of the blades of the other set for distributing the fondant in the direction of the opposite ends of said chamber.

2. In a distributor for fondant, cream and the like, a substantially tubular casing, a rotatable shaft journaled in said casing, means for rotating said shaft, a multiplicity of blade members carried by said shaft in spaced relation therearound, an inlet port for fondant and the like adjacent the center of said tubular casing, the blades of said rotatable shaft member being divided into independent sets, with the blades of one set extending in an angular direction opposite the angular direction of the blades of the other set for distributing fondant delivered centrally of said tubular casing in directions toward the remote ends of said casing.

3. In a distributor for fondant, cream and the like, a cylindrical casing, a rotatable shaft journaled at opposite ends of said casing, means for rotating said shaft, a central port for introducing fondant into said casing, and a multiplicity of blades extending radially from said rotatable shaft and spaced one from another longitudinally of said shaft, said blades being divided into two sections, with the blades of one section disposed in an angular direction opposite to the angular disposition of the blades of the other section, whereby fondant delivered centrally of said cylindrical casing is advanced toward the remote ends of said casing.

4. In a machine for distributing fondant, cream and the like, a tubular casing, a rotatable shaft journaled axially of said casing, means for rotatably driving said shaft, a port for the delivery of fondant to said casing in a position centrally thereof, said shaft having two sets of angularly disposed blade members thereon spaced at intervals along the length of said shaft, with one set of angularly disposed blade members located on one side of the port through which the fondant is admitted to said tubular casing, and the other set of said blade members being disposed on the other side of said port, whereby fondant is distributed from a central position in said tubular casing to the remote ends of said casing.

5. A distributor for fondant, cream and the like comprising a cylindrical casing, a rotatable shaft journaled axially of said casing, a central port, means for introducing fondant centrally of said casing, sets of angularly disposed blades carried by said shaft in spaced relation along the length thereof and extending radially to a position adjacent the interior walls of the cylindrical casing, said blades being divided into two sets, with the blades of one set inclined in an angular direction opposite to the angular disposition of the blades of the other set, whereby fondant delivered centrally of said cylindrical casing is distributed to the remote ends of said casing.

6. In a distributor for fondant, cream and the like, a tubular casing, a rotatable shaft journaled for rotative movement axially of said casing, means for driving said rotatable shaft, said casing having means for receiving fondant, cream and the like in a position substantially central of said casing, blade members carried by said rotatable shaft in spaced relation along the length thereof, said blade members being divided into sets, with the blade members of one set angularly disposed in a direction opposite the disposition of the blade members of the other set for advancing the fondant or cream in opposite directions through said casing, the blades adjacent the center of said casing being relatively narrow in width, and the blade members of each set increasing in width toward the end of said casing.

In testimony whereof I affix my signature.

WILLIAM F. HELLER.